United States Patent [19]
Yoshioka et al.

[11] Patent Number: 5,154,057
[45] Date of Patent: Oct. 13, 1992

[54] INTERNAL COMBUSTION ENGINE WITH A DUAL TURBOCHARGER SYSTEM

[75] Inventors: Mamoru Yoshioka, Susono; Toshihisa Sugiyama, Gotenba; Toru Kidokobo, Susono, all of Japan

[73] Assignee: Toyota Jidosha Kabushiki Kaisha, Toyota, Japan

[21] Appl. No.: 645,635

[22] Filed: Jan. 25, 1991

[30] Foreign Application Priority Data

| Jan. 25, 1990 | [JP] | Japan | 2-13693 |
| Jan. 31, 1990 | [JP] | Japan | 2-19086 |
| Mar. 7, 1990 | [JP] | Japan | 2-53565 |

[51] Int. Cl.⁵ ............................................. F02B 37/12
[52] U.S. Cl. ............................................. 60/612; 60/600
[58] Field of Search ......................... 60/602, 612, 600

[56] References Cited

U.S. PATENT DOCUMENTS

| 4,793,140 | 12/1988 | Esch | 60/612 X |
| 4,982,567 | 1/1991 | Hashimoto et al. | 60/612 X |
| 5,003,781 | 4/1991 | Shibata et al. | 60/612 X |
| 5,005,359 | 4/1991 | Tashima et al. | 60/612 X |
| 5,035,114 | 7/1991 | Shibata et al. | 60/612 |

FOREIGN PATENT DOCUMENTS

| 334228 | 9/1989 | European Pat. Off. |
| 259722 | 12/1965 | Japan . |
| 145328 | 8/1984 | Japan . |
| 112734 | 5/1986 | Japan . |
| 315614 | 12/1989 | Japan . |
| 42123 | 2/1990 | Japan . |

*Primary Examiner*—Michael Koczo
*Attorney, Agent, or Firm*—Cushman, Darby & Cushman

[57] ABSTRACT

An internal combustion engine with a dual turbocharger system includes a first turbocharger operated through an entire intake air quantity, a second turbocharger operated only at large intake air quantities, an exhaust bypass conduit bypassing a turbine of the second turbocharger, an exhaust bypass valve installed in the exhaust bypass conduit, and exhaust bypass valve opening control means for controlling at least one of a time to begin opening and a speed of opening the exhaust bypass valve. The exhaust bypass valve is opened before the turbocharger operation is switched from a "one-turbocharger-operation" to a "two-turbocharger-operation" so that the second turbocharger is run-up and a smooth transition can be obtained. The exhaust bypass valve begins to open at a lower charging pressure when a transmission gear position is low than when the gear position is high, a period of time for running-up the second turbocharger is lengthened so that the second turbocharger is sufficiently run-up and a torque shock at the transition form "one-turbocharger-operation" to "two-turbocharger-operation" is minimized.

10 Claims, 11 Drawing Sheets

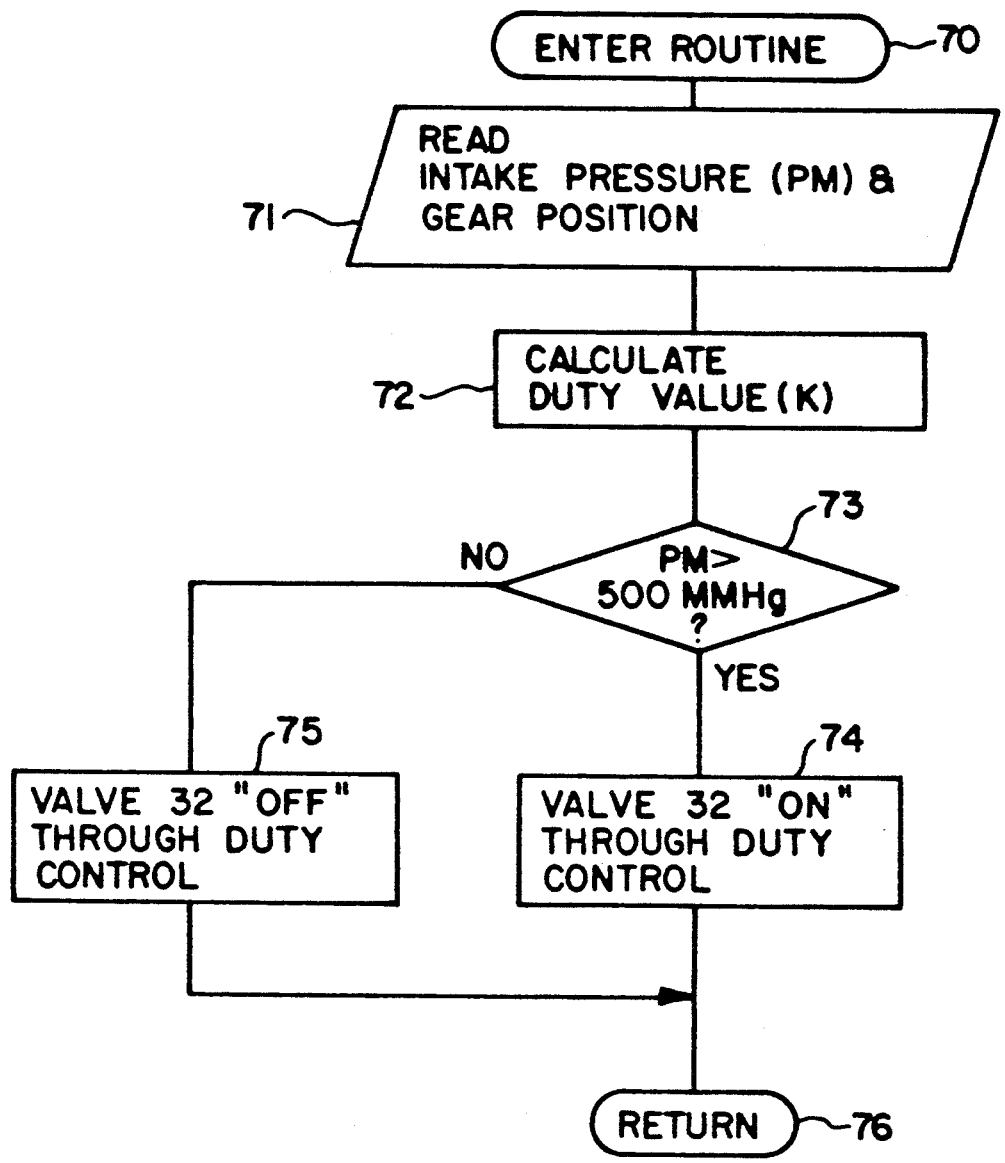

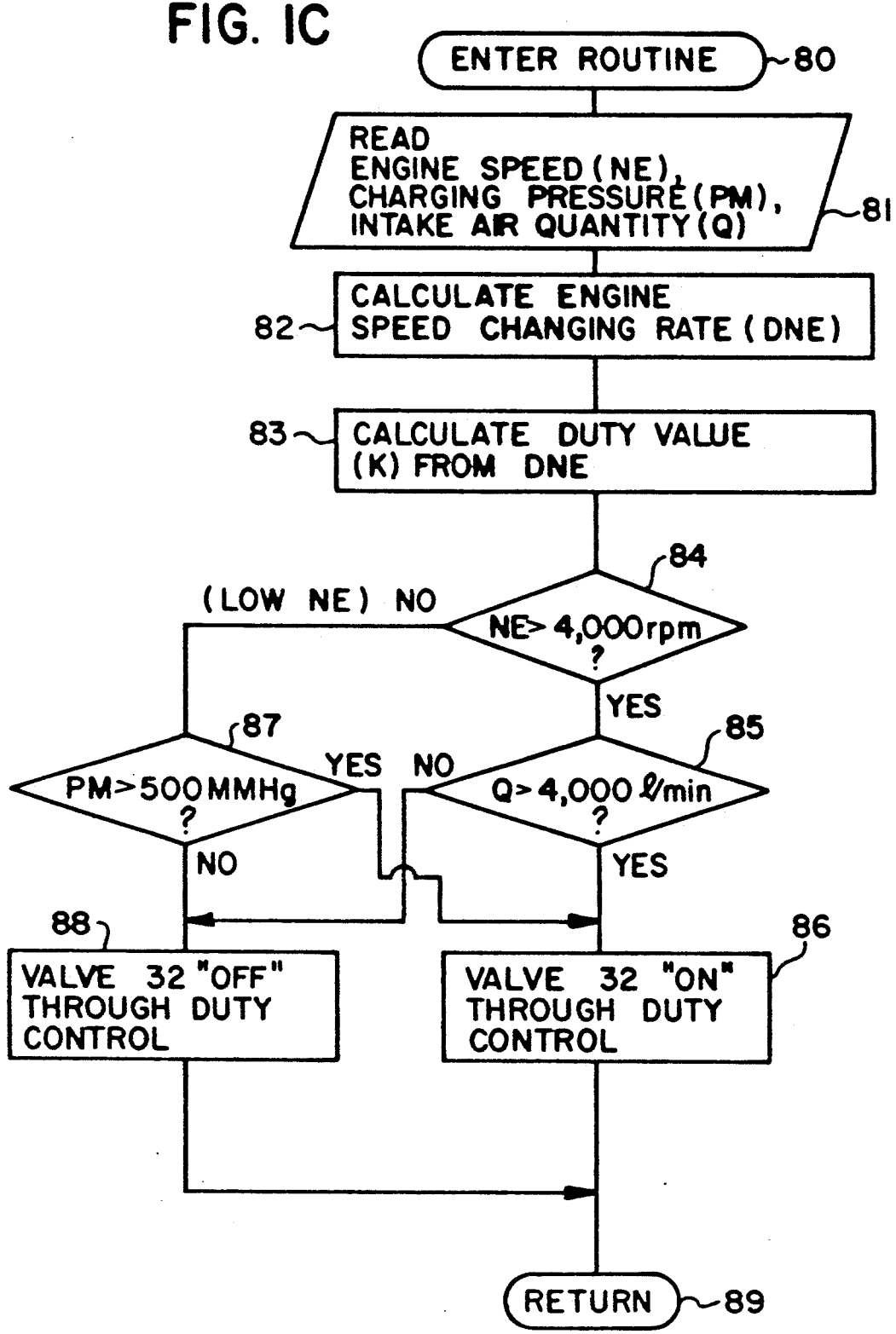

5,154,057

INTERNAL COMBUSTION ENGINE WITH A DUAL TURBOCHARGER SYSTEM

BACKGROUND OF THE INVENTION

1. Field of the Invention

The present invention relates to an internal combustion engine with a dual turbocharger system having a first turbocharger and a second turbocharger in which air is charged to the engine by only the first turbocharger at small to medium intake air quantities and is charged by both the first and the second turbochargers at large intake air quantities.

2. Description of the Prior Art

As illustrated in FIG. 11 (Prior Art), a conventional turbocharged internal combustion engine 1' is provided with a first turbocharger 7' and a second turbocharger 8' having turbines 7a' and 8a', respectively, and compressors 7b' and 8b', respectively. An exhaust switching valve 17' is installed in an exhaust conduit 20b' downstream of the turbine 8a'. Similarly, an intake switching valve 18' is installed in an intake conduit 14b' downstream of the compressor 8b'. Further, an intake bypass valve 33' is installed in an intake bypass conduit 13' bypassing the compressor 8b'. The intake switching valve 18' and the exhaust switching valve 17' are closed at small to medium intake air quantities to produce "one-turbocharger-operation" wherein only the first turbocharger 7' is operated. The intake switching valve 18' and the exhaust switching valve 17' are opened at large intake air quantities to produce "two-turbocharger-operation" wherein both the first turbocharger 7' and the second turbocharger 8' are operated. A smooth transition from a "one-turbocharger-operation" to a "two-turbocharger-operation" is obtained by partially opening the exhaust switching valve 17' to run-up the second turbocharger 7'. In the conventional turbocharger system, the exhaust switching valve 17' begins to be partially opened at a substantially constant charging pressure and is opened at a substantially constant opening speed whether the transmission coupled to the engine is at a low gear position or at a high gear position.

However, partially opening the exhaust switching valve as described above can degrade system performance. More particularly, because the exhaust switching valve 17' is partially opened at a constant pressure, a large shock is likely to occur during transition from the "one-turbocharger-operation" to the "two-turbocharger-operation" when the transmission is in low gear. Also, because the exhaust switching valve 17' is opened at a constant opening speed, either an overcharging at low transmission gear positions or a charging pressure decrease at high transmission gear positions is likely to occur during transition from the "one-turbocharger-operation" to the "two-turbocharger-operation". Further, the transition characteristic is affected by not only the opening speed of the exhaust switching valve but also an engine speed changing rate which is in turn affected by a road condition.

SUMMARY OF THE INVENTION

One object of the present invention is to provide an internal combustion engine having a dual turbocharger system capable of a smooth transition from a "one-turbocharger-operation" to a "two-turbocharger-operation".

The above-described object can be attained by the internal combustion engine of the present invention by providing a multi-cylinder internal combustion engine with an air intake and an exhaust gas outlet, a first turbocharger and a second turbocharger arranged in parallel with each other with respect to the engine and each including a turbine and a compressor driven by the turbine, an intake switching valve installed downstream of the second turbocharger compressor, an exhaust switching valve installed downstream of the second turbocharger turbine, an exhaust bypass conduit bypassing the exhaust switching valve, an exhaust bypass valve installed in the exhaust bypass conduit, and exhaust bypass valve opening control means for controlling at least a timing for beginning to open the exhaust bypass valve or an exhaust bypass valve opening speed, or both.

In a case where the exhaust bypass valve opening control means is adapted to begin opening the exhaust bypass valve at a lower charging pressure at lower gear positions than at higher gear positions, the period of time for running-up the second turbocharger is increased at the lower gear positions, so that the second turbocharger is sufficiently run-up and the torque shock which may occur at the transition from the "one-turbocharger-operation" to the "two-turbocharger-operation" is minimized at lower gear positions.

Also, in a case where the exhaust bypass valve opening control means is adapted to open the exhaust bypass valve more quickly at lower gear positions than at higher gear positions, abrupt increases of the charging pressure at the lower gear positions must be suppressed so that the risk of over-charging at the lower gear positions is minimized, and drawn out increases of the charging pressure at the higher gear positions must be prevented so that the risk of a momentary, serious decrease in the charging pressure is also minimized.

Further, in a case where the exhaust bypass valve opening control means is adapted to open the exhaust bypass valve more quickly when the engine speed changing rate is high than when the engine speed changing rate is low, an optimum charging pressure changing characteristic can be obtained so that the torque shock at the transition from "one-turbocharger-operation" to "two-turbocharger-operation" can be minimized.

BRIEF DESCRIPTION OF THE DRAWINGS

The above-described object and other objects, features, and advantages of the present invention will become more apparent and will be more readily appreciated from the following detailed description of the preferred embodiments of the invention taken in conjunction with the accompanying drawings, in which:

FIG. 1B is a flow chart illustrating an operation control of an exhaust bypass valve of an internal combustion engine with a dual turbocharger system in accordance with a second embodiment of the present invention;

FIG. 1C is a flow chart illustrating an operation control of an exhaust bypass valve of an internal combustion engine with a dual turbocharger system in accordance with a third embodiment of the present invention;

DETAILED DESCRIPTION OF THE PREFERRED EMBODIMENTS

Figure 1A:
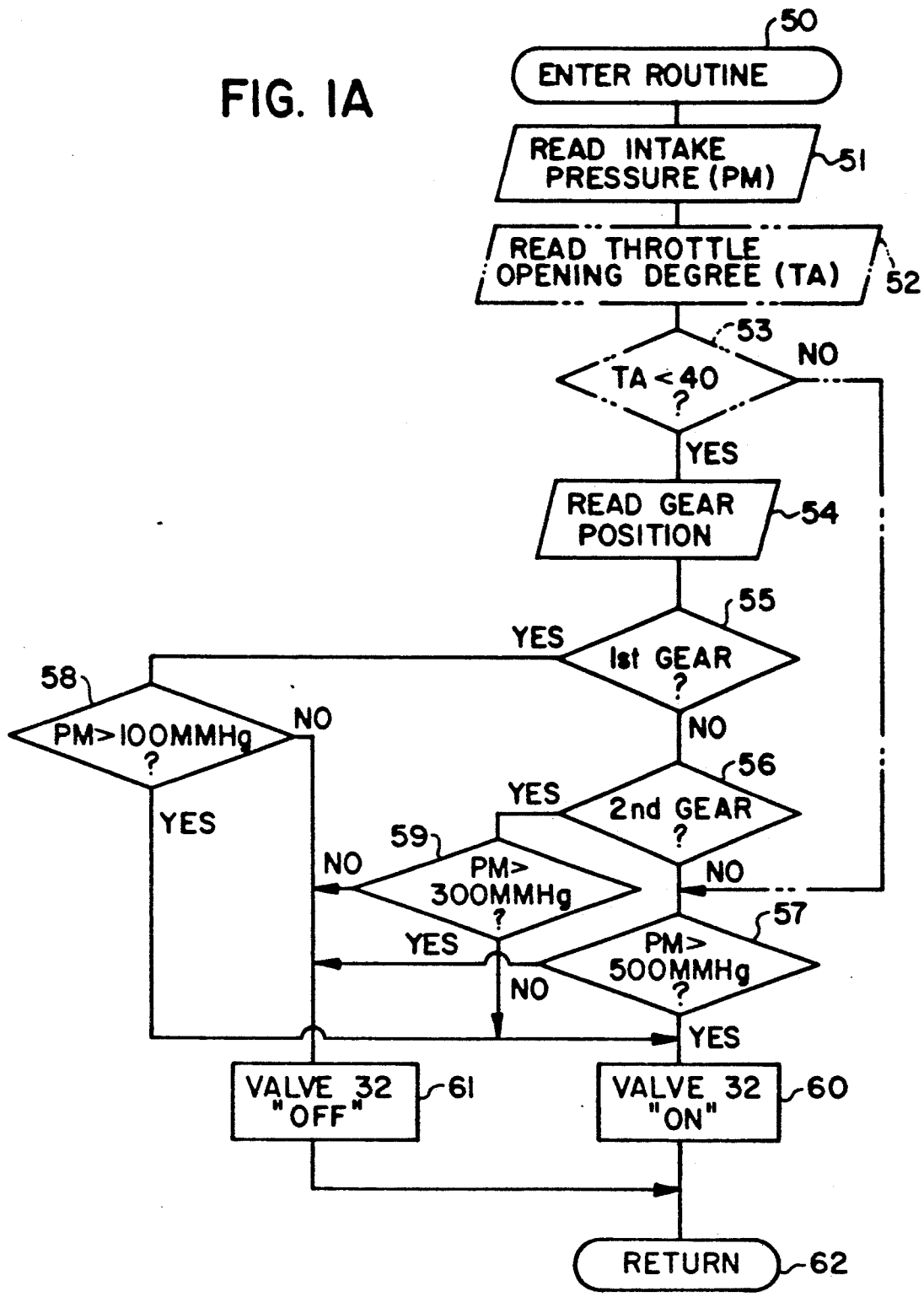
FIG. 1A is a flow chart illustrating an operation control of an exhaust bypass valve of an internal combustion engine with a dual turbocharger system in accordance with a first embodiment of the present invention.

Three embodiments will be described below. The relationships between the various embodiments and drawings are as follows:

FIGS. 1A and 2–5 correspond to a first embodiment of the invention wherein the timing for beginning to open an exhaust bypass valve is changed in accordance with a transmission gear position. FIGS. 1B, 2 and 3, and 6 to 8 correspond to a second embodiment of the invention wherein an opening speed of an exhaust bypass valve is changed in accordance with a transmission gear position. FIGS. 1C, 2 and 3, and 9 to 11 correspond to a third embodiment of the invention wherein an opening speed of an exhaust bypass valve is changed in accordance with not only a transmission gear position but also a condition of a road. Throughout the embodiments and drawings, like members are denoted with like reference numerals.

Figure 3:
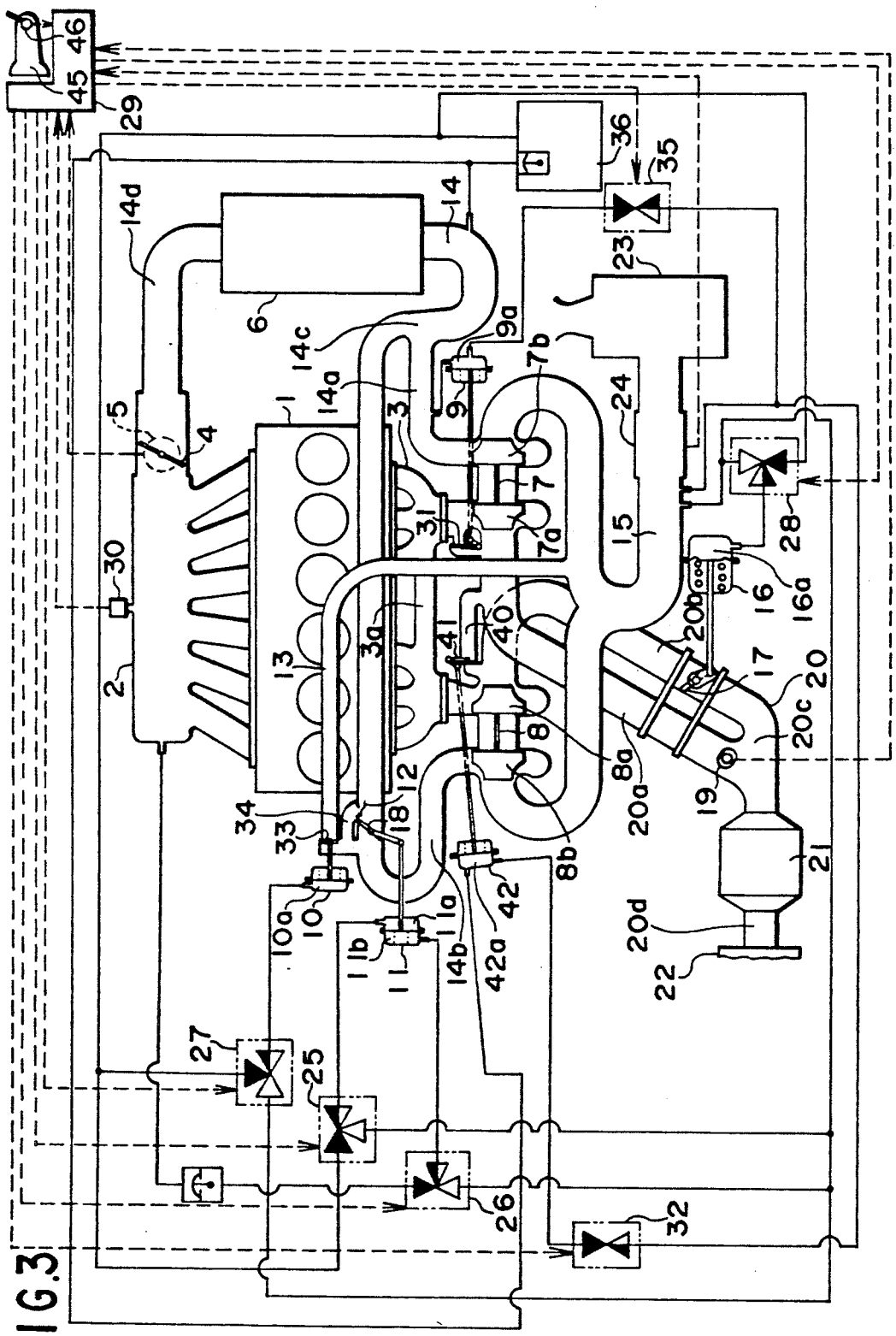
FIG. 3 is a schematic view of the internal combustion engine with a dual turbocharger system in accordance with any one of the first through third embodiments of the invention.

First, structures common to every embodiment will be explained with reference to FIG. 3. An internal combustion engine with a dual turbocharger system in accordance with the present invention includes a multi-cylinder engine 1, for example a six-cylinder internal combustion engine, with an air intake and an exhaust gas outlet. Cylinders of the engine 1 are grouped into two groups. An exhaust manifold 3 which is connected with the engine exhaust outlets includes a first portion connected with one group of the engine cylinders and a second portion connected with another group of the engine cylinders. The first portion and the second portion of the exhaust manifold 3 communicate with each other by a connecting conduit 3a.

A first turbocharger 7 and a second turbocharger 8 are provided so as to be in parallel with each other with respect to the engine 1. The first turbocharger 7 is operated throughout all intake air quantities, and the second turbocharger 8 is operated only at large intake air quantities. The first turbocharger 7 includes a turbine 7a and a compressor 7b driven by the turbine 7a. Similarly, the second turbocharger 8 includes a turbine 8a and a compressor 8b driven by the turbine 8a. The turbine 7a is connected with the first portion of the exhaust manifold 3 and the turbine 8a is connected with the second portion of the exhaust manifold 3. As a result, the first and second turbines 7a and 8a are connected with the engine exhaust gas outlet via the exhaust manifold 3. On the other hand, the compressor 7b and the compressor 8b are connected with the air intake of the engine 1 via an intake line.

The intake line connected with the engine air intake includes a first intake passage 15 positioned upstream of the compressors 7b and 8b and a second intake passage 14 positioned downstream of the compressors 7b and 8b. Further, the second intake passage 14 includes a first intake conduit 14a located downstream of and connected with the compressor 7b, a second intake conduit 14b located downstream of and connected with the compressor 8b, a connecting portion 14c where the first intake conduit 14a and the second intake conduit 14b join each other, and a common intake conduit 14d connecting the connecting portion 14c with the engine air intake. In the first intake passage 15, an air cleaner 23 and an air flow meter 24 are installed in that order in an intake air flow direction. An intercooler 6, a throttle valve 4, and a surge tank 2 are also installed in an intake air flow direction, respectively, in the common intake conduit 14d.

An exhaust line 20 connected to the engine exhaust gas outlets includes a first exhaust conduit 20a connected to the first portion of the exhaust manifold 3, in which the turbine 7a is installed, a second exhaust conduit 20b connected to the second portion of the exhaust manifold 3, in which the turbine 8a is installed, a connecting portion 20c where the first exhaust conduit 20a and the second exhaust conduit 20b join each other, and an exhaust pipe 20d located downstream of and connected to the connecting portion 20c. In the exhaust pipe 20d, a catalytic converter 21 and an exhaust muffler 22 are installed in an exhaust gas flow direction, respectively. Further, at the connecting portion 20c or in the vicinity of the connecting portion 20c, an oxygen sensor 19 is installed.

For the purpose of switching the operation from a "one-turbocharger-operation" in which only the first turbocharger 7 is operated at small to medium intake air quantities to a "two-turbocharger-operation" in which both the first turbocharger 7 and the second turbocharger 8 are operated at large intake air quantities, an exhaust switching valve 17 is installed in the second exhaust conduit 20b downstream of the turbine 8a, and an intake switching valve 18 is installed in the second intake conduit 14b downstream of the compressor 8b. When both the exhaust switching valve 17 and the intake switching valve 18 are closed, the operation of the second turbocharger 8 is stopped and therefore, only the first turbocharger 7 is in operation. In contrast, when both the exhaust switching valve 17 and the intake switching valve 18 are opened, both the first turbocharger 7 and the second turbocharger 8 are in operation.

For the purpose of minimizing the shock which typically accompanies the transition from a "one-turbocharger-operation" to a "two-turbocharger-operation", the second turbocharger 18 should be run-up before it is fully rotated. In the conventional turbocharged engine, this running-up of the second turbocharger 8 is achieved by partially opening the exhaust switching valve. In the present invention, however, an exhaust bypass conduit 40 is provided bypassing the exhaust switching valve 17, and the running-up of the second turbocharger 8 is achieved by opening an exhaust bypass valve 41 installed in the exhaust bypass conduit 40. More particularly, when the exhaust bypass valve 41 is opened, a relatively small amount of exhaust gas flows through the exhaust bypass conduit 40, such that the second turbocharger 8 is run-up. When the exhaust switching valve 17 is opened, the rotational speed of the second turbocharger 8 is increased from a run-up rotational speed and not from a standstill whereby the transition shock is effectively suppressed When the second turbocharger 8 is preliminarily rotated and the intake switching valve 18 is closed, a portion of the pressurized air in the second intake conduit 14b between the compressor 8b and the intake switching valve 18 will leak through the compressor 8b and flow to a portion of the intake conduit upstream of the compressor 8b and then will again be driven by the compressor 8b. Following which, this same air will then again be driven by the compressor 8b and compressed into the portion of the intake conduit downstream of the compressor 8b. This leakage and re-pressurization of the intake air will repeat continually, undesirably increasing the temperature of the intake air and thus, the temperature of the impeller of the compressor 8b itself. To prevent the compressed air from temperature increases, an intake bypass conduit 13 is provided to bypass the compressor 8b of the second turbocharger 8. More particularly, the intake bypass conduit 13 connects the portion of the second intake conduit 14b positioned between the compressor 8b and the intake switching valve 18 with the first intake passage 15 upstream of the compressors 7b and 8b. An intake bypass valve 33 is installed and is adapted to open and close the intake bypass conduit 13. When the second turbocharger 8 is preliminarily rotated, the intake bypass valve 33 is opened to minimize the intake air temperature increase.

An intake switching valve bypass conduit 34 may be provided to connect a portion of the second intake conduit 14b positioned upstream of the intake switching valve 18 with a portion of the intake conduit 14b positioned downstream of the intake switching valve 18 to bypass the intake switching valve 18. A check valve 12 is installed in the intake switching valve bypass conduit 34. The check valve 12 permits the intake air to flow in the direction from the portion of the second intake conduit 14b positioned upstream of the intake switching valve 18 toward the portion of the second intake conduit 14b positioned downstream of the intake switching valve 18. As a result, when the intake switching valve 18 is closed and the compressor outlet pressure of the second turbocharger 8 grows to exceed a compressor outlet pressure of the first turbocharger 7, the check valve 12 opens the bypass conduit 34 and permits the intake air to flow through the check valve 12. Further, the turbine 7a is provided with a waste gate valve 31. A positive pressure tank 36 is also provided so as to be connected with a portion of the common intake conduit 14d upstream of the intercooler 6 and to hold a charging pressure therein.

Various actuators are provided to operate the above-described valves. More particularly, the waste gate valve 31 is operated by an actuator 9, the intake bypass valve 33 is operated by an actuator 10, the intake switching valve 18 is operated by an actuator 11, the exhaust switching valve 17 is operated by an actuator 16, and the exhaust bypass valve 41 is operated by the actuator 42. Each of these actuators comprises a single diaphragm-type actuator.

Various three-way or two-way solenoid valves 25, 26, 27, 28, 32 and 35 are provided to switch on and off the actuators 9, 10, 11, 16, and 42. These solenoid valves 25, 26, 27, 28, 32 and 35 operate according to the instructions from an engine control computer 29. In this instance, "ON" of the three-way solenoid valve 25 or "ON" of the three-way valve 26 actuates the actuator 11 to open the intake switching valve 18, and "OFF" of the three-way solenoid valve 25 or "OFF" of the three-way solenoid valve 26 actuates the actuator 11 to close the intake switching valve 18. The diaphragm actuator 11 includes a diaphragm operatively coupled to the intake switching valve 18, a first chamber 11a on one side of the diaphragm, and a second chamber 11b on another side of the diaphragm. The solenoid valve 25 is connected to the first chamber 11a and is adapted to alternate between conducting a positive pressure from the positive pressure tank 36 into the first chamber 11a at large intake air quantities thereby opening the intake switching valve 18 and conducting an atmospheric pressure into the first chamber 11a at small to medium intake air quantities thereby closing the intake switching valve 18. The three-way solenoid valve 26 is connected to the second chamber 11b and adapted to switch between conducting an atmospheric pressure into the second chamber 11b at high engine loads thereby closing the intake switching valve 18 and conducting a negative pressure from the surge tank 2 into the second chamber 11b at low engine loads thereby opening the intake switching valve 18 despite the small to medium intake air quantities.

Similarly, "ON" of the three-way solenoid valve 28 actuates the actuator 16 to open the exhaust switching valve 17, and "OFF" of the three-way solenoid valve 28 actuates the actuator 16 to close the exhaust switching valve 17. "ON" of the three-way solenoid valve 27 actuates the actuator 10 to close the intake bypass valve 33, and "OFF" of the three-way solenoid valve 27 actuates the actuator 10 to open the intake bypass valve 33. "ON" of the two-way solenoid valve 32, which serves as a duty control valve, actuates the actuator 42 to open the exhaust bypass valve 41, and "OFF" of the two-way solenoid valve 32 actuates the actuator 42 to close the exhaust bypass valve 41. Further, the actuator 16 includes a diaphragm chamber 16a, the actuator 10 includes a diaphragm chamber 10a, the actuator 11 includes diaphragm chambers 11a and 11b, the actuator 42 includes a diaphragm chamber 42a, and the actuator 9 includes a diaphragm chamber 9a.

Various sensors for sensing the engine operating conditions are provided and the outputs of these sensors are fed to the engine control computer 29. More particularly, the various sensors include an intake pressure sensor 30, a throttle opening degree detecting sensor 5, an intake air quantity detecting sensor comprising an air flow meter 24, the aforementioned oxygen sensor 19, an engine speed sensor or crank angle sensor (not shown), a vehicle speed sensor (not shown), and a gear position sensor 46 of a transmission 45 coupled to the turbocharged engine 1.

Figure 2:
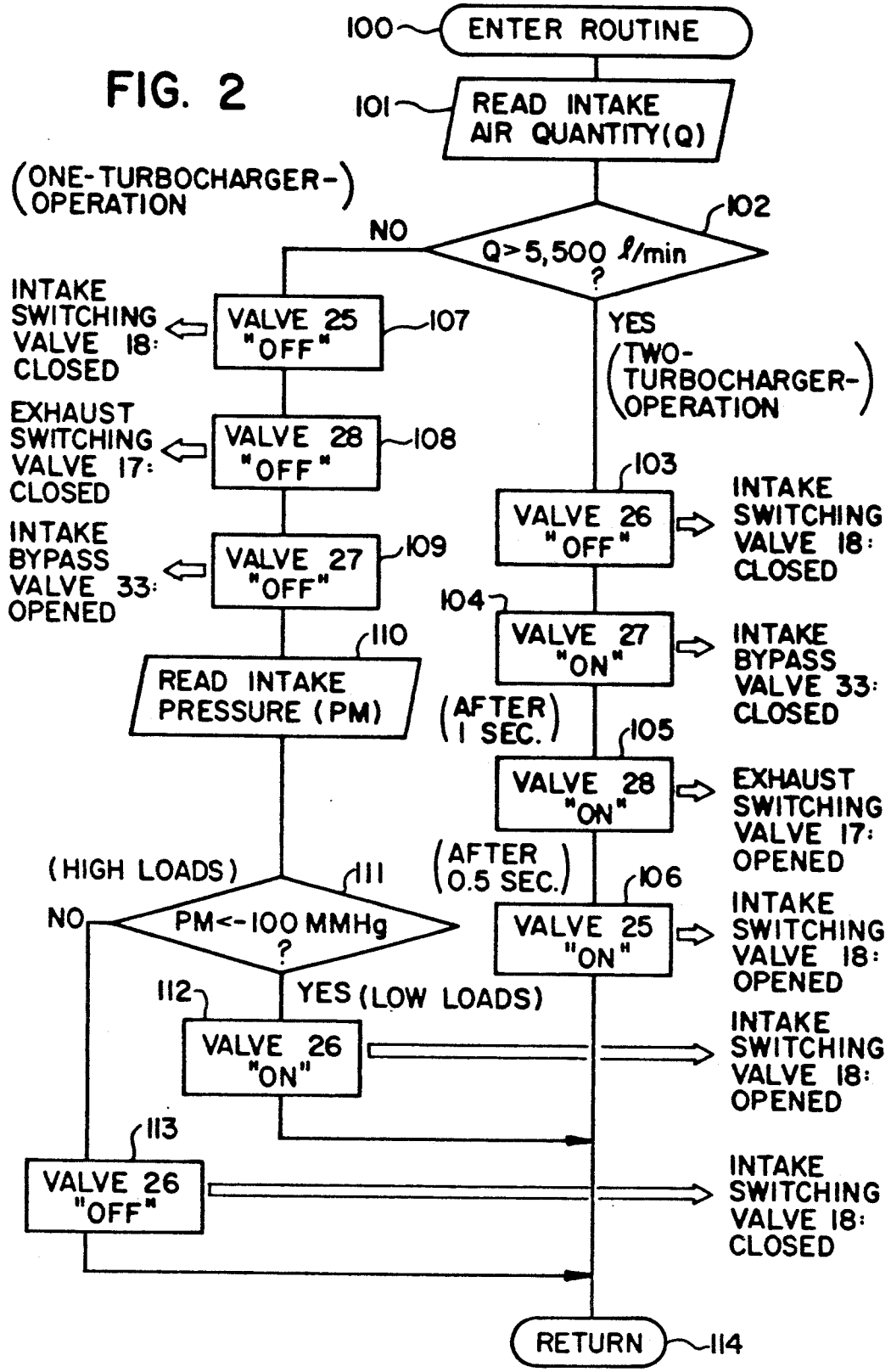
FIG. 2 is a flow chart illustrating an operation control of the internal combustion engine with a dual turbocharger system in accordance with any one of the first through third embodiments of the invention.

The engine control computer 29 includes a central processor unit (CPU), a read-only memory (ROM), a random access memory (RAM), an input and output interface (I/O interface), and an analogue/digital convertor (A/D convertor) like a usual micro computer. FIGS. 1 and 2 illustrate a program according to which the turbocharged internal combustion engine is operated. The programs of FIGS. 1A (first embodiment), 1B (second embodiment), 1C (third embodiment) and 2 (common to every embodiment) are stored in the ROM and are fed into the CPU where the routines are executed to operate the above-described valves and actuators.

The routine of FIG. 2 is entered at step 100. Then, at step 101, the current intake air quantity which is an output signal from the air flow meter 24 is read. Then, at step 102, it is determined whether or not the intake air quantity Q is larger than a predetermined quantity, for example, 5,500 l/min, that is, whether or not the current engine operational condition is a condition to be operated under a "two-turbocharger-operation". More particularly, when the Q is larger than 5,500 l/min, the existant condition is deemed to be one at which a "two-turbocharger-operation" operation is called for. In contrast, when Q is equal to or less than 5,500 l/min, the existant condition is deemed to be one at which a "one-turbocharger-operation" operation is proper. However, since there is a time lag for the charging pressure to reach 500 mm Hg after the valves 17 and 18 are switched on, switching of the valves 17 and 18 should be executed at 5,500 l/min rather than at 6,000 l/min. as shown in step 102 of FIG. 5.

When it is determined that the engine is at a condition at which "two-turbocharger-operation" is proper at step 102, the routine proceeds to a step 103. At step 103, in a case where the intake switching valve 18 is at a partially opened state, the three-way solenoid valve 26 is switched to "OFF" to close the intake switching valve 18. Then, at step 104, the three-way solenoid valve 27 is switched to "ON" to introduce the intake pressure at a portion of the intake conduit downstream of the compressor (the charging pressure into the diaphragm chamber 10a of the actuator 10 to thereby close the intake bypass valve 33.

The routine then proceeds further to step 105. At step 105, after a short period of time necessary to run-up the second turbocharger 8, for example, one second after the switching-on of the three-way solenoid valve 27, the three-way solenoid valve 28 is switched to "ON" to introduce the charging pressure into the diaphragm chamber 16a of the actuator 16 thereby opening the exhaust switching valve 17. If the compressor outlet pressure of the second turbocharger 8 grows greater than the compressor outlet pressure of the first turbocharger 7, the charging air pressurized by the second turbocharger 8 passes through the check valve 12 and is supplied to the engine 1. Then, at step 106, after a short period of time, for example, 0.5 seconds after the switching-on of the three-way solenoid valve 28, the three-way solenoid valve 25 is switched to "ON" to introduce the charging pressure into the diaphragm chamber 11a of the actuator 11 thereby opening the intake switching valve 18. In this state, both the first turbocharger 7 and the second turbocharger 8 are in operation. Then, the routine proceeds to a step 114 and returns.

When the engine operational condition is determined at step 102 to be one at which "one-turbocharger-operation" is proper, the routine proceeds to a step 107. At step 107, the three-way valve 25 is switched to "OFF" to close the intake switching valve 18. Then, at step 108, the three-way solenoid valve 28 is switched to "OFF" to close the exhaust switching valve 17. Then, at step 109, the three-way solenoid valve 27 is switched to "OFF" to open the intake bypass valve 33. By these steps 107, 108 and 109, the "one-turbocharger-operation" is produced. In this state, even if the second turbocharger 8 is rotated by the engine exhaust pressure, the air pressurized by the compressor 8b returns to the first intake passage 15 through the intake bypass conduit 13.

Following the above, the routine proceeds to a step 110 where the intake gas pressure PM is read. Then, the routine proceeds to a step 111 where it is determined whether or not the engine load is low, for example, whether or not the intake pressure PM is smaller than −100 mm Hg. If the PM is equal to or larger than −100 mm Hg and, therefore, the engine load is high, the routine proceeds to a step 113 where the three-way solenoid valve 26 is switched to "OFF" closing the intake switching valve 18. In this state, since the intake switching valve 18 is closed and the exhaust switching valve 17 is closed, the turbocharged system operates according to the "one-turbochargeroperation" and a good torque response is obtained.

When the PM is smaller than −100 mm Hg and, therefore, the engine load is determined to be low at step 1, the routine proceeds to a step 112. At step 112, the three-way solenoid valve 26 is switched to "ON" to introduce the negative pressure at the surge tank 2 into a diaphragm chamber 11b of the actuator 11 thereby opening the intake switching valve 18. In this state, since the exhaust switching valve 17 is closed, the second turbocharger 8 is not driven and only the first turbocharger 7 is in operation. Because the intake switching valve 18 is open, however, the intake air can be sucked through both the first intake conduit 14a and the second intake conduit 14b. As a result, a great amount of intake air can be supplied to the engine 1 improving the acceleration characteristic from a low engine load. Then, the routine proceeds to a step 114 and returns.

For the purpose of suppressing a torque shock at the transition from the "one-turbocharger-operation" to the "two-turbocharger-operation", the second turbocharger 8 is run-up by opening the exhaust bypass valve 41 before the changing of the turbine operation from the "one-turbocharger-operation" to the "two-turbocharger-operation". Controls for opening the exhaust bypass valve 41 vary according to the respective embodiments.

Next, structures and operation thereof specific to each embodiment will be explained:

FIRST EMBODIMENT

Figure 4:
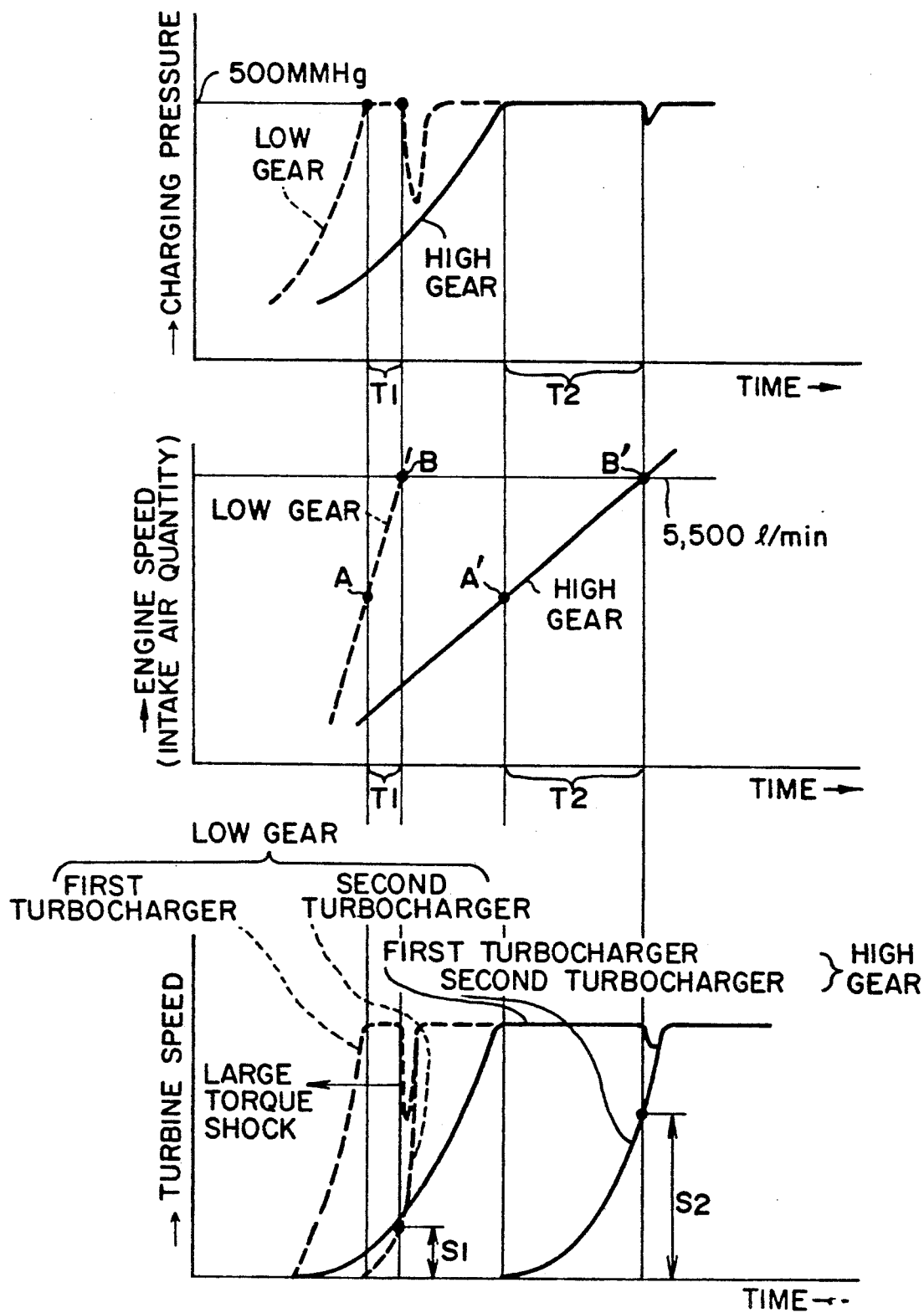
FIG. 4 is a charging pressure, engine speed, and turbine speed versus time diagram illustrating problems existing in a conventional turbocharged engine.

As illustrated in FIG. 4, in the conventional turbocharged engine, both the engine speed and the charging pressure increase more quickly during acceleration at a low gear (for example, at a first gear of a transmission) than during acceleration at a high gear (for example, at a fourth gear of a transmission). In this instance, the engine speed increases more quickly than the charging pressure. Therefore, the period of time (Tl) that elapses between the time when the charging pressure rises to a predetermined pressure (for example, 500 mm Hg) and the exhaust switching valve begins to be partially opened at point A and the time when the intake air quantity increases to a predetermined value (for example, 5,500 l/min) and the transition from "one-turbocharger-operation" to "two-turbocharger-operation" is executed at point B is less during low gear acceleration than the period of time (T2) that elapses between the time when the charging pressure rises to the predetermined pressure and the exhaust switching valve begins to be partially opened at point A' and the time when the intake air quantity increases to the predetermined value and the transition to "two-turbocharger-operation" is executed at point B' during high gear acceleration. As a result, the partial opening of the exhaust switching valve at low gear acceleration causes a turbine speed increment (S1) of the second turbocharger to be smaller than the turbine speed increment (S2) of this same turbine at the high gear acceleration. Thus, there is a higher risk of a serious decrease in the charging pressure, that is a larger torque shock, occuring during the transition from one turbocharger operation to two turbocharger operation during low gear acceleration than during high gear acceleration.

For the purpose of minimizing the above-described torque shock, in the first embodiment of the present invention, an exhaust bypass valve opening control means is provided for controlling the timing to begin opening of the exhaust bypass valve 41. More particularly, the exhaust bypass valve opening control means includes a routine of FIG. 1A controlling the timing to begin opening the exhaust bypass valve 41 in accordance with a transmission gear position.

The routine of FIG. 1A is entered at step 50. Then, at step 51, the current intake air pressure is read. This pressure is an output signal of the intake pressure sensor 30. Also, at step 54, the current transmission gear position is read from the output signal of the gear position sensor 46 of the transmission 45. Then, the routine proceeds to a step 55, where transmission gear position is determined.

When the gear position is determined to be the first gear position at step 55, the routine proceeds to a step 58, where, it is determined whether or not the current intake pressure PM is higher than a predetermined first charging pressure, for example 100 mm Hg. When the charging pressure PM is determined to be higher than the predetermined first charging pressure at step 58, the routine proceeds to a step 60, where the solenoid valve 32 is switched to "ON" so that the exhaust bypass valve 41 is opened and the second turbocharger 8 begins to be run-up. When the charging pressure PM is determined to be equal to or lower than the predetermined first charging pressure at step 58, the routine proceeds to a step 61, where the solenoid valve 32 is switched to "OFF" so that the exhaust bypass valve 41 is closed.

When the current transmission gear position is determined to not be the lowest gear position at step 55, the routine proceeds to a step 56, where it is determined whether or not the current gear position is equal to the second lowest gear position, that is the second gear position. When the gear position is determined to be the second gear position, the routine proceeds to a step 59, where it is determined whether or not the current intake air pressure PM is higher than a predetermined second charging pressure, which is higher than the first charging pressure, for example 300 mm Hg. When the charging pressure is higher than the second charging pressure, the routine proceeds to the step 60 and the exhaust bypass valve 41 is opened, and when the charging pressure is determined to be equal to or lower than the second charging pressure at step 59, the routine proceeds to the step 61 and the exhaust bypass valve 41 is closed.

When the current transmission gear position is determined to not be the second lowest position, the routine proceeds to the following step where it is determined whether or not the current gear position is a third lowest gear position, a fourth gear position, or a highest gear position. After such procedures, the routine finally proceeds to a step 57 where it is determined whether or not the current intake air pressure is higher than a predetermined highest charging pressure, for example 500 mm Hg. When the current intake air pressure is determined to be higher than the predetermined charging pressure at step 57, the routine proceeds to the step 60 and the exhaust bypass valve 41 is opened. In contrast, when the current intake air pressure is determined to be equal to or lower than the predetermined charging pressure at step 57, the routine proceeds to the step 61 and the exhaust bypass valve 41 is closed. From step 60 or 61, the routine proceeds to a step 62 and returns. In the steps 57, 58, and 59, the intake air pressure may be replaced by an intake air quantity.

In the above-described routine, steps 52 and 53 may be inserted between the steps 51 and 54. More particularly, the charging pressure decrease discussed with reference to FIG. 4 will happen more seriously under a quick acceleration than under a slow acceleration. Therefore, at step 52, a throttle opening degree TA which is an output of throttle opening degree sensor 5 is read. Then, at step 53, whether or not the throttle opening degree is smaller than a predetermined opening degree (for example, 40°) is determined. When the opening degree is determined to be smaller than the predetermined degree at step 53, the current acceleration is deemed to be a quick one, and the routine proceeds to the step 54 so that the above-described control of the exhaust bypass valve 41 is performed. When the opening degree is determined to be equal to or larger than the predetermined opening degree at step 53, the current acceleration is deemed to be a slow one, and the routine proceeds to the step 57 so that the above-described control is skipped.

Figure 5:
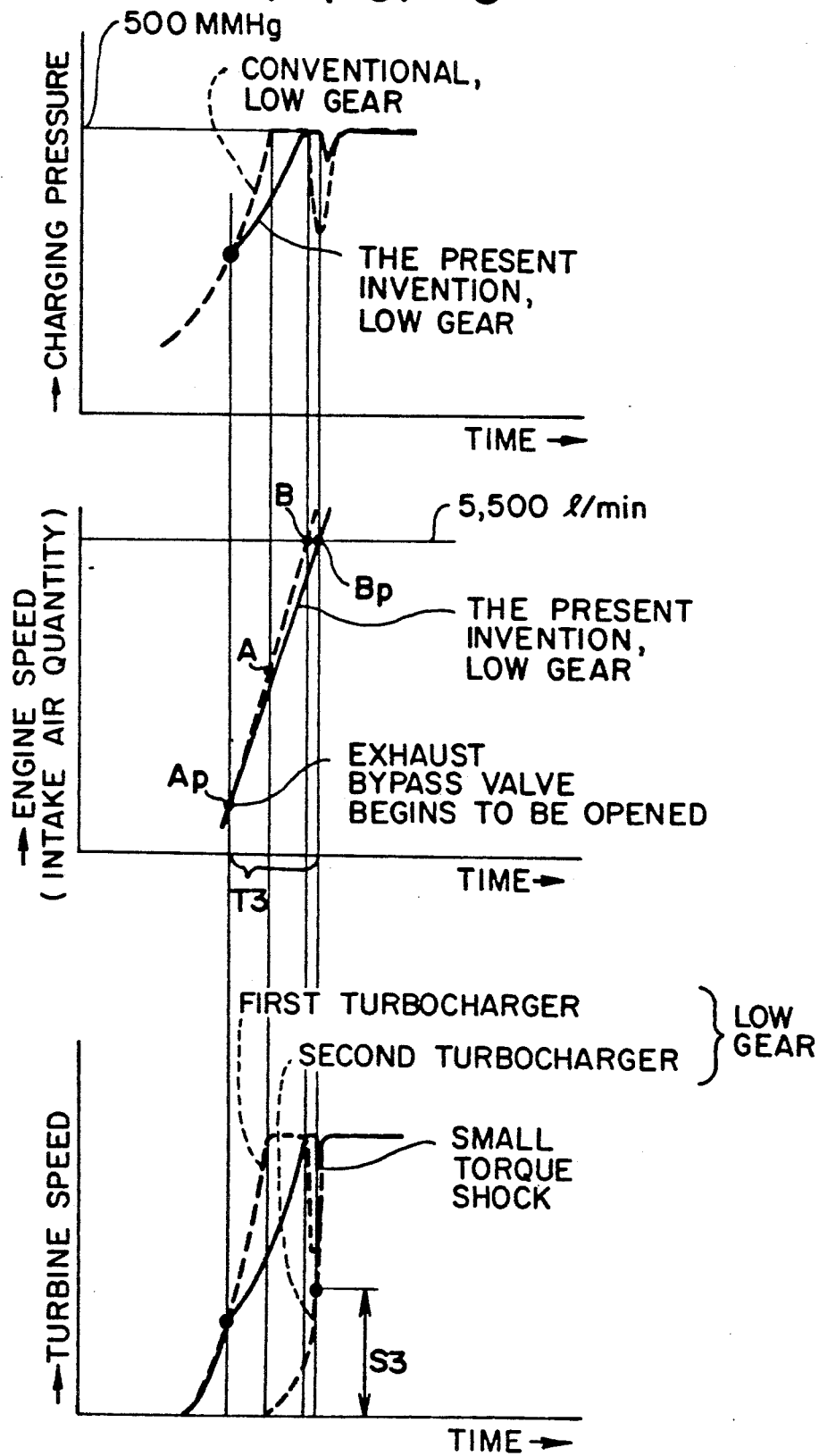
FIG. 5 is a charging pressure, engine speed, and turbine speed versus time diagram illustrating an improvement of the first embodiment of the invention.

FIG. 5 illustrates an improvement in the charging pressure decrease or torque shock of the first embodiment in comparison with that of the conventional turbocharged engine. In FIG. 5, the lines correspond to the first embodiment of the invention and the broken lines correspond to the conventional engine. Because the exhaust bypass valve 41 begins to open at a low charging pressure when the transmission 45 is at a low gear position, the rising-up of the charging pressure is slow. As a result, the period of time (T3) between the time when the exhaust bypass valve 41 begins to open at point Ap and the time when the intake air quantity increases to the predetermined quantity (for example, 5,500 l/min) and the "one-turbocharger-operation" is changed to the "two-turbocharger-operation" at point Bp is lengthened, so that an increment S3 of the turbine speed of the second turbocharger 8 is large and the second turbocharger 8 is sufficiently run-up. Therefore, a decrease in the charging pressure or a torque shock at the transition from the "one-turbocharger-operation" to the "two-turbocharger-operation" is minimized.

SECOND EMBODIMENT

In the conventional turbocharged engine, the exhaust switching valve is partially opened at a predetermined constant pressure, for example at 500 mm Hg, whether the transmission is at a low gear position or at a high gear position. Due to the constant pressure, the opening speed of the exhaust switching valve of the conventional turbocharged engine is constant, that is, independent of the gear position of the transmission. However, the rising-up speed of the charging pressure and the acceleration characteristic are strongly affected by the gear position of the transmission. In this instance, the lower the gear position is, the larger the rising-up speed of the charging pressure and the acceleration speed are. Therefore, as illustrated by a two-dotted line in FIG. 7, if the opening speed of the exhaust switching valve is too slow, the charging pressure will momentarily increase beyond the predetermined pressure (for example, 500 mm Hg), and over-charging will happen during low gear acceleration. Contrarily, as illustrated by a two-dotted line in FIG. 8, if the opening speed of the exhaust switching valve is too quick, the charging pressure will momentarily decrease, and a relatively large torque shock will occur during high gear acceleration.

The above-described momentary increase or decrease of the charging pressure can be prevented in the second embodiment of the present invention during the transition from a "one-turbocharger-operation to a "two-turbocharger-operation" by changing the opening speed of the exhaust bypass valve 41 in accordance with the current gear ratio of the transmission. This opening speed control is performed by exhaust bypass valve opening control means which comprises means for opening the exhaust bypass valve 41 more quickly at lower transmission gear positions than at higher transmission gear positions.

Figure 6:
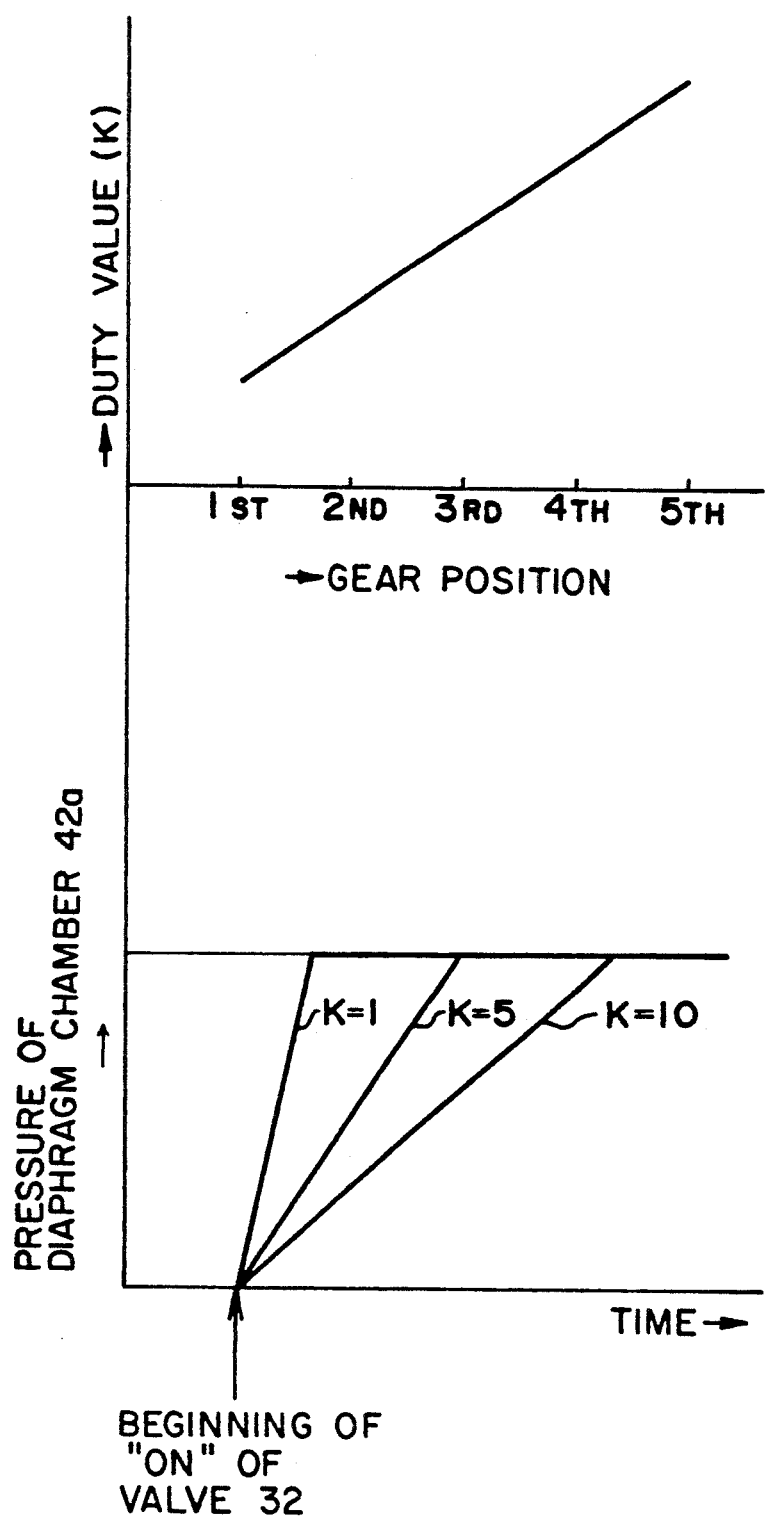
FIG. 6 is an operational characteristic diagram of a duty control solenoid valve used in the internal combustion engine in accordance with the second embodiment of the invention.
Figure 7:
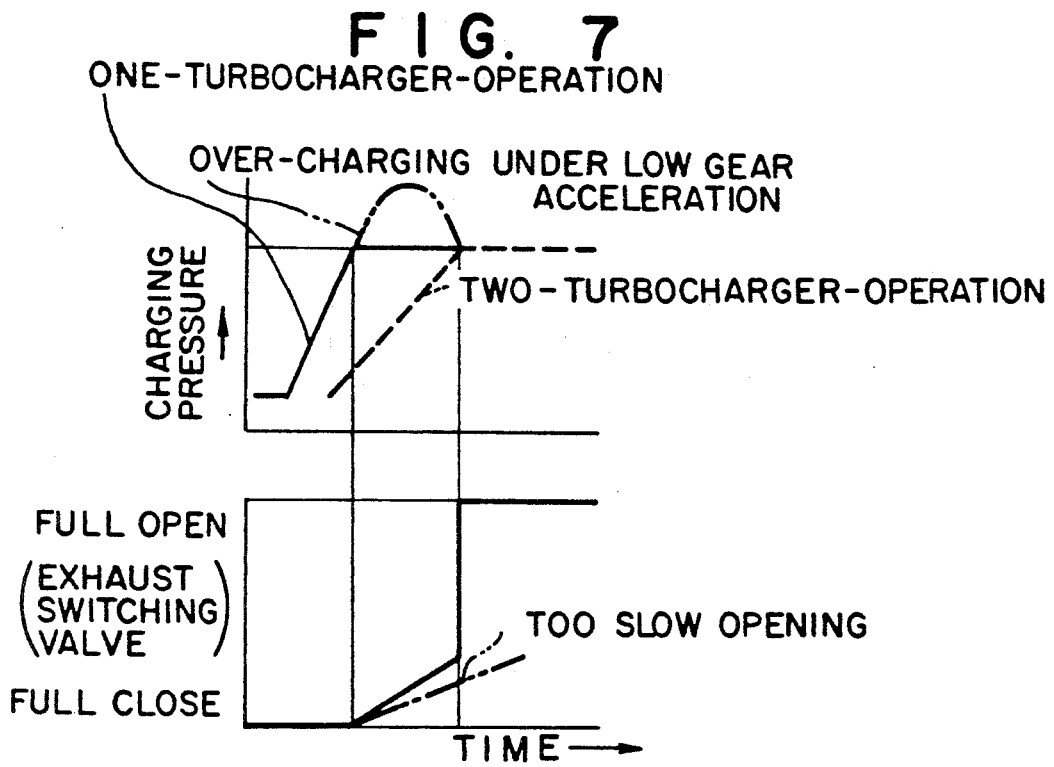
FIG. 7 is a charging pressure versus time diagram at a low gear acceleration illustrating a problem existing in a conventional turbocharged engine and an improvement of the second embodiment of the invention.
Figure 8:
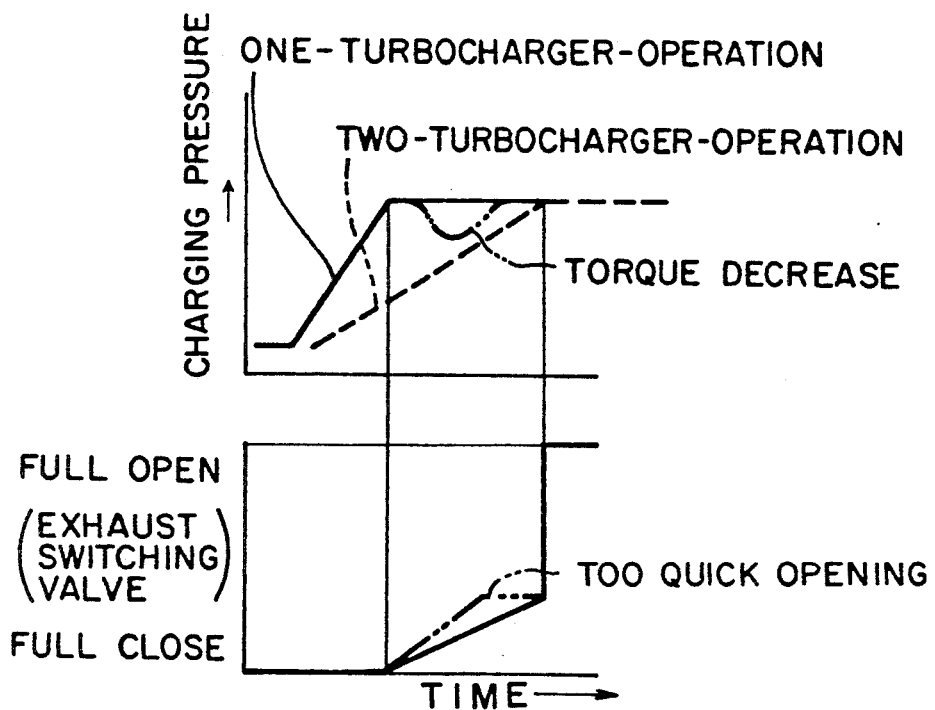
FIG. 8 is a charging pressure versus time diagram at a high gear acceleration illustrating a problem existing in a conventional turbocharged engine and an improvement of the second embodiment of the invention.
Figure 9:
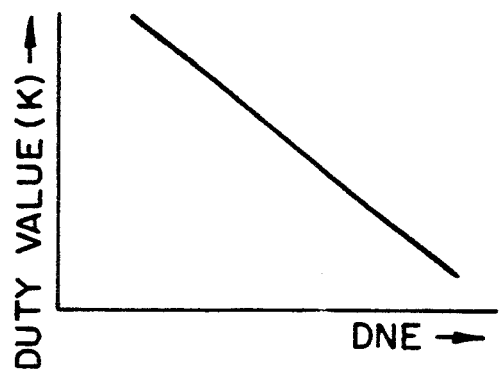
FIG. 9 is a duty value versus engine speed changing rate diagram of a duty control valve used in the internal combustion engine in accordance with the third embodiment of the invention.

More particularly, the exhaust bypass valve opening speed control means comprises a routine of FIG. 1B. At step 70, the routine is entered. Then, at step 71, a current intake pressure PM, which is an output signal of the intake pressure sensor 30, and a current gear position, which is an output signal of the gear position sensor 46, are read. Then, at step 72, a duty value K for control of the solenoid valve 32 is calculated from the gear position sensor using a map shown in FIG. 6. In this instance, the lower the gear position is, the smaller the K value is selected. As illustrated in FIG. 6, the smaller the K value is, the more quickly the pressure of the diaphragm chamber 42a rises and therefore the more quickly the exhaust bypass valve 41 is opened.

Then, the routine proceeds to a step 73, where it is determined whether or not the intake pressure PM is higher than a predetermined pressure, for example 500 mm Hg. When the PM is determined to be higher than the predetermined pressure at step 73, the routine proceeds to a step 74, where the solenoid valve 32 is switched to "ON" through duty control. In this instance, when the K value is small, the valve 32 is quickly opened, and when the K value is large, the valve 32 is slowly opened. In contrast, when PM is determined to be equal to or lower than the predetermined pressure, the routine proceeds to a step 75, where the solenoid valve 32 is switched to "OFF" through duty control.

In accordance with the second embodiment, the lower the transmission gear position is, the more quickly the exhaust bypass valve 41 is opened. When the exhaust bypass valve 41 is opened, one portion of the exhaust gas escapes to the second turbocharger turbine 8a and therefore, result, the charging pressure is unlikely to rise quickly and over-charging during acceleration at a low gear is effectively prevented. In contrast, the higher the transmission gear position is, the more slowly the exhaust bypass valve 41 is opened. Therefore, a momentary decrease in the charging pressure is effectively prevented.

THIRD EMBODIMENT

Figure 10:
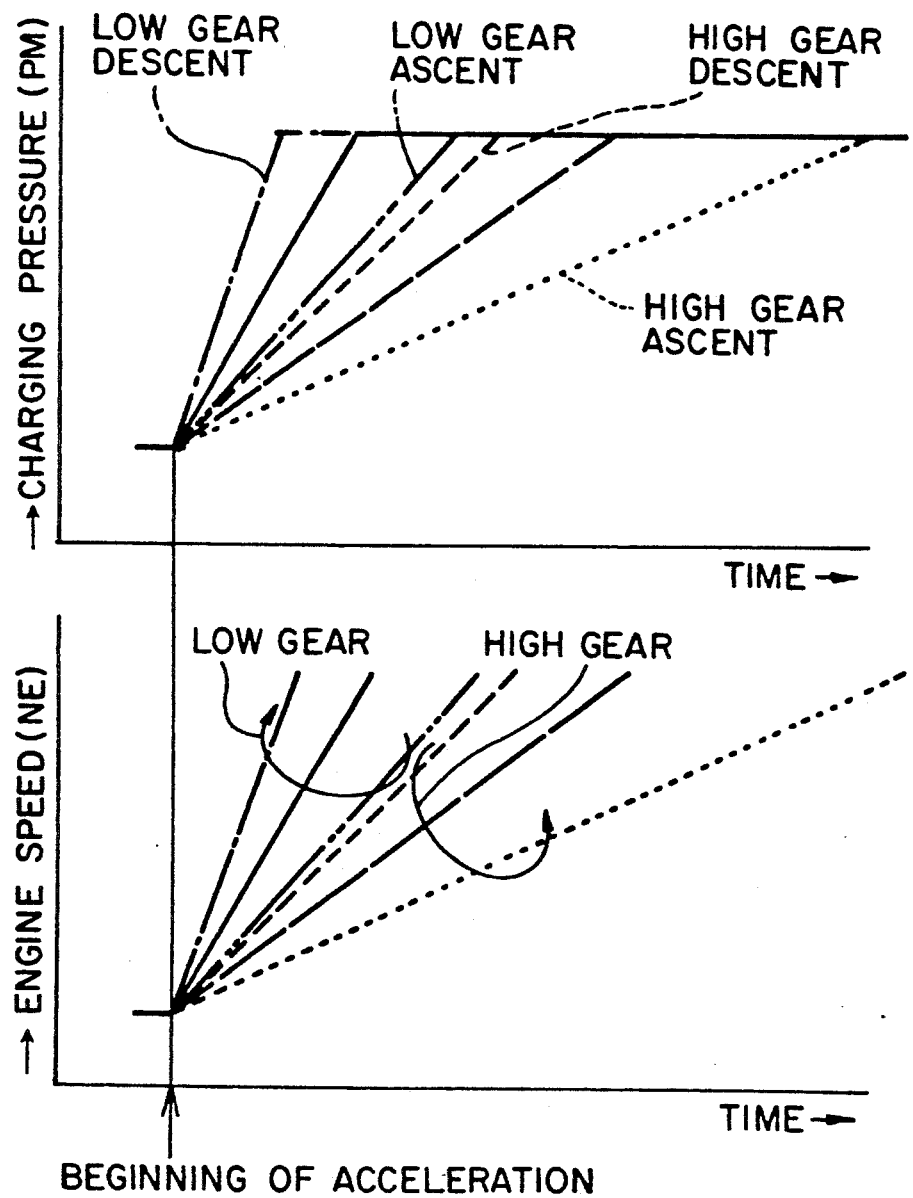
FIG. 10 is a charging pressure and an engine speed versus time diagram of the internal combustion engine in accordance with the third embodiment of the invention.
Figure 11:
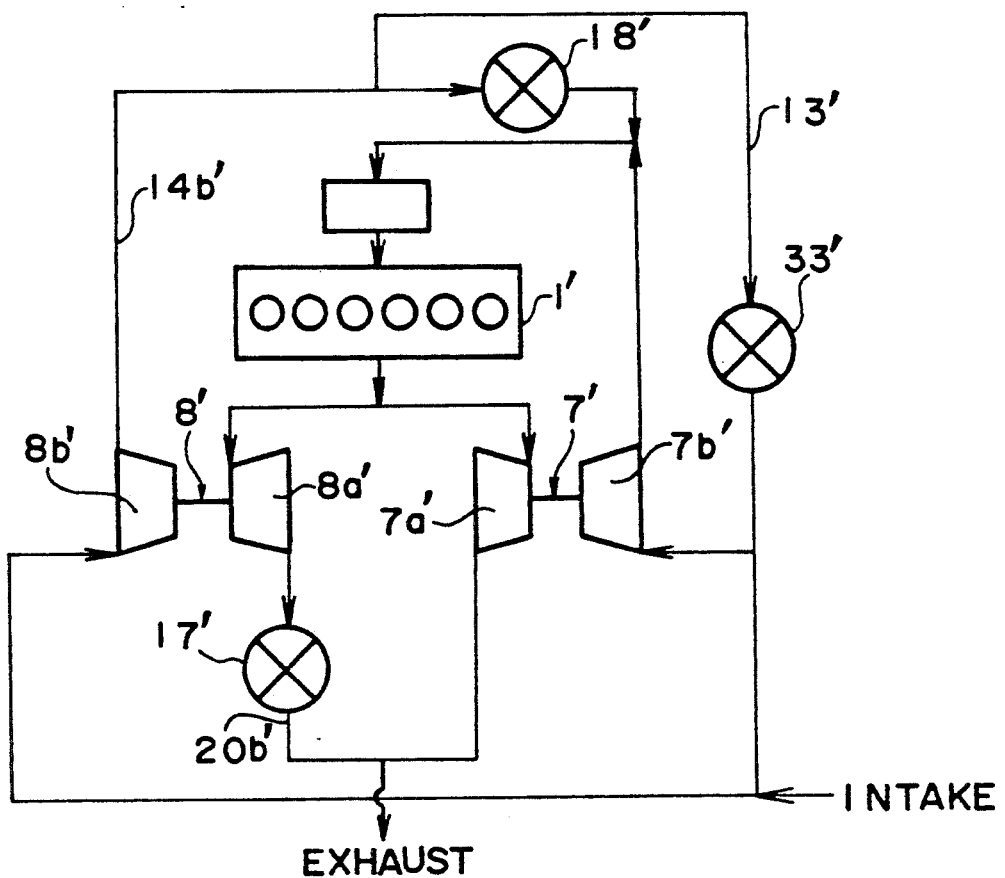
FIG. 11 is a system diagram of a conventional dual turbocharger system.

As illustrated in FIG. 10, the charging pressure rising versus time characteristic is affected not only the transmission gear position but also affected by the road condition. More particularly, in a case where the road is an ascent, both the engine acceleration and the charging pressure increase rate are slow, even if the gear position is a low one. In contrast, in a case where the road is a descent, the charging pressure increase rate is quick.

For the purpose of controlling the operation of the turbocharged engine as exactly as possible, an exhaust bypass valve opening control means is provided in the third embodiment of the invention for controlling the opening and the closing of the exhaust bypass valve 41 as exactly as possible taking into consideration the current road condition. The exhaust bypass valve opening control means includes means for opening the exhaust bypass valve 41 more quickly when the current engine speed changing rate (the current engine acceleration rate) is large than when the current engine acceleration rate is small. The exhaust bypass valve opening control means comprises a routine of FIG. 1C.

More particularly, the routine of FIG. 1C is entered at step 80. Then, at step 81, the current engine speed NE, which is an output signal of the engine speed sensor, the current intake air quantity Q, which is an output signal of the air flow meter 24, and the current charging pressure PM, which is an output signal of the intake pressure sensor 30, are read. Then, at step 82, the current engine acceleration rate DNE is calculated on the basis of the current engine speed NE. Then, at step 83, a duty value K for controlling the opening and closing speed of the exhaust bypass valve 41 is calculated using a duty value versus engine speed changing rate map of FIG. 9. In this instance, the larger the engine acceleration rate DNE is, the smaller the duty value K is, and therefore, the more quickly the exhaust bypass valve 41 is opened.

Then, the routine proceeds to a step 84, where it is determined whether or not the current engine speed NE is higher than a predetermined engine speed, for example 4,000 rpm. When the engine speed is determined to be equal to or lower than the predetermined engine speed at step 84, the routine proceeds to a step 87, where it is determined whether or not the current intake pressure PM is higher than a predetermined charging pressure, for example 500 mm Hg. When the intake pressure is determined to be higher than the predetermined charging pressure at step 87, the routine proceeds to a step 86, where the solenoid valve 32 is switched to "ON" through duty control so that the exhaust bypass valve 41 at the controlled speed and the second turbocharger 8 begins to be run-up. When the intake pressure PM is determined to be equal to or lower than the predetermined charging pressure at step 87, the routine proceeds to a step 88, where the solenoid valve 32 is switched to "OFF" through duty control so that the exhaust bypass valve 41 is closed at the controlled speed.

When the engine speed is determined to be higher than the predetermined engine speed at step 84, the routine proceeds to a step 85, where it is determined whether or not the current intake air quantity Q is larger than a predetermined intake air quantity, for example 4,000 l/min. When the intake air quantity Q is determined to be larger than the predetermined intake air quantity at step 85, the routine proceeds to a step 86 and the exhaust bypass valve 41 is opened through duty control. When the intake air quantity Q is determined to be equal to or smaller than the predetermined intake air quantity at step 85, the routine proceeds to step 88 and the exhaust bypass valve 41 is closed through duty control. From one of the steps 86 and 88, the routine proceeds to a returning step 89.

In the third embodiment, the larger the engine acceleration rate DNE is, the more quickly the exhaust bypass valve 41 is opened. As a result, an optimum charging pressure characteristic is obtained and a torque shock at the transition from the "one-turbocharger-operation" to the "two-turbocharger-operation" is minimized. Further advantages will be obtained when the exhaust bypass valve 41 is opened and closed in accordance with the routine of FIG. 1C. More particularly, since the condition for opening of the exhaust bypass valve 41 is determined on the basis of a charging pressure at relatively low engine speeds (see steps 84 and 87), a torque decrease at the transition from the "one-turbocharger-operation" to the "two-turbocharger-operation" is prevented. Also, since the condition for opening of the exhaust bypass valve 41 is determined on the basis of a charging pressure at relatively high engine speeds (see steps 84 and 85), the possibility of skipping the run-up of the second turbocharger 8 is prevented at the transition from the "one-turbocharger-operation" to the "two-turbocharger-operation".

In the above-described first through third embodiments, the control over the timing and speed of opening was applied to the exhaust bypass valve 41. However, the control can be applied to a partial opening of the exhaust switching valve 17. In such a case where the exhaust switching valve 17 is partially opened to run-up the second turbocharger 8, the exhaust bypass conduit 40 and the exhaust bypass valve 41 need not be provided. In such a case, the solenoid valve 28 should comprise a duty control valve, and the opening beginning timing and opening speed of the solenoid valve 28 should be controlled like the solenoid valve 32 in the cases of the first through third embodiments.

Although only a few embodiments of the invention have been described in detail above, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. An internal combustion engine with a dual turbocharger system comprising:
   a multi-cylinder internal combustion engine with an air intake and an exhaust gas outlet;
   a first and a second turbocharger arranged in parallel with each other with respect to the engine, each including a turbine and a turbine driven compressor, the turbines being connected with the exhaust gas outlet of the engine;
   an intake switching valve installed downstream of the second turbocharger compressor and an exhaust switching valve installed in an exhaust conduit in which the second turbocharger is installed;
   means for measuring an intake air quantity;
   means for detecting a transmission gear position;
   means for opening the intake and exhaust switching valves whenever the intake air quantity is greater than a predetermined air quantity and for closing the intake and exhaust switching valves whenever the intake air quantity is equal to or less than the predetermined intake air quantity;
   an exhaust bypass conduit bypassing the exhaust bypassing the exhaust switching valve and an exhaust bypass valve installed in the exhaust bypass conduit; and
   exhaust bypass valve opening control means for controlling a speed of opening the exhaust bypass valve.

2. An internal combustion engine with a dual turbocharger system according to claim 1, wherein the exhaust bypass valve opening control means comprises means for opening the exhaust bypass valve at a lower charging pressure at a low transmission gear position than at a high transmission gear position.

3. An internal combustion engine with a dual turbocharger system according to claim 1, wherein the exhaust bypass valve opening control means comprises means for opening the exhaust bypass valve more quickly at a low transmission gear position than at a high transmission gear position.

4. An internal combustion engine with a dual turbocharger system according to claim 1, the exhaust bypass valve opening control means comprises means for opening the exhaust bypass valve more quickly at a large engine acceleration rate than at a small engine acceleration rate.

5. An internal combustion engine with a dual turbocharger system according to claim 1, and further comprising an engine speed sensor for detecting an engine speed, an intake air pressure sensor for detecting an intake air pressure, and a transmission gear sensor for detecting a gear position of a transmission.

6. An internal combustion engine with a dual turbocharger system according to claim 5, and further comprising an engine control computer, serving as the exhaust bypass valve opening control means, storing program for calculating the speed of opening of the exhaust bypass valve on teh basis of output signals of the sensors being fed to the engine control computer.

7. An internal combustion engine with a dual turbocharger system according to claim 1, and further comprising a diaphragm type actuator coupled to the exhaust bypass valve serving to open and close the exhaust bypass valve and a duty control solenoid valve operatively connected to the actuator, the duty control solenoid valve being operated in accordance with an instruction from the exhaust bypass valve opening control means.

8. An internal combustion engine with a dual turbocharger system comprising:
   a multi-cylinder internal combustion engine with an air intake and an exhaust gas outlet;
   a first and a second turbocharger arranged in parallel with each other with respect to the engine, each including a turbine and a turbine driven compressor, the turbines being connected with the exhaust gas outlet of the engine;

an intake switching valve installed downstream of the second turbocharger compressor and an exhaust switching valve installed in an exhaust conduit in which the second turbocharger is installed;

means for measuring an intake air quantity;

means for detecting a transmission gear position;

means for measuring a charging pressure;

means for opening the intake and exhaust switching valves whenever the intake air quantity is greater than a predetermined air quantity and for closing the intake and exhaust switching valves whenever the intake air quantity is equal to or less than the predetermined intake air quantity;

an exhaust bypass conduit bypassing the exhaust switching valve and an exhaust bypass valve installed in the exhaust bypass conduit; and exhaust bypass valve opening control means for opening the exhaust bypass valve at a lower charging pressure at a low transmission gear position than at a high transmission gear position.

9. An internal combustion engine with a dual turbocharger system comprising:

a multi-cylinder internal combustion engine with an air intake and an exhaust gas outlet;

a first and a second turbocharger arranged in parallel with each other with respect to the engine, each including a turbine and a turbine driven compressor, the turbines being connected with the exhaust gas outlet of the engine;

an intake switching valve installed downstream of the second turbocharger compressor and an exhaust switching valve installed in an exhaust conduit in which the second turbocharger is installed;

means for measuring an intake air quantity;

means for detecting a transmission gear position;

means for opening the intake and exhaust switching valves whenever the intake air quantity is greater than a predetermined air quantity and for closing the intake and exhaust switching valves whenever the intake air quantity is equal to or less than the predetermined intake air quantity;

an exhaust bypass conduit bypassing the exhaust switching valve and an exhaust bypass valve installed in the exhaust bypass conduit; and exhaust bypass valve opening control means for controlling a speed of opening the exhaust bypass valve, the exhaust bypass valve opening control means opening the exhaust bypass valve more quickly at a low transmission gear position than at a high transmission gear position.

10. An internal combustion engine with a dual turbocharger system comprising:

a multi-cylinder internal combustion engine with an air intake and an exhaust gas outlet;

a first and a second turbocharger arranged in parallel with each other with respect to the engine, each including a turbine and a turbine driven compressor, the turbines being connected with the exhaust gas outlet of the engine;

an intake switching valve installed downstream of the second turbocharger compressor and an exhaust switching valve installed in an exhaust conduit in which the second turbocharger is installed;

means for measuring an intake air quantity;

means for detecting a transmission gear position;

means for opening the intake and exhaust switching valves whenever the intake air quantity is greater than a predetermined air quantity and for closing the intake and exhaust switching valves whenever the intake air quantity is equal to or less than the predetermined intake air quantity;

an exhaust bypass conduit bypassing the exhaust switching valve and an exhaust bypass valve installed in the exhaust bypass conduit; and exhaust bypass valve opening control means for controlling a speed of opening the exhaust bypass valve, the exhaust bypass valve opening control means opening the exhaust bypass valve more quickly at a low transmission gear position than at a small engine acceleration rate.

* * * * *